(12) United States Patent
Li et al.

(10) Patent No.: US 12,131,835 B2
(45) Date of Patent: Oct. 29, 2024

(54) MULTI-DIMENSIONAL OPTICAL TWEEZERS CALIBRATION DEVICE AND METHOD BASED ON ELECTRIC FIELD QUANTITY CALIBRATION

(71) Applicants: ZHEJIANG LAB, Zhejiang (CN); ZHEJIANG UNIVERSITY, Zhejiang (CN)

(72) Inventors: Cuihong Li, Hangzhou (CN); Zhiming Chen, Hangzhou (CN); Yuanyuan Ma, Hangzhou (CN); Xiaowen Gao, Hangzhou (CN); Zhenhai Fu, Hangzhou (CN); Huizhu Hu, Hangzhou (CN)

(73) Assignees: ZHEJIANG LAB, Hangzhou (CN); ZHEJIANG UNIVERSITY, Hangzhou (CN)

( * ) Notice: Subject to any disclaimer, the term of this patent is extended or adjusted under 35 U.S.C. 154(b) by 406 days.

(21) Appl. No.: 17/695,865

(22) Filed: Mar. 16, 2022

(65) Prior Publication Data

US 2022/0344070 A1    Oct. 27, 2022

(30) Foreign Application Priority Data

Apr. 26, 2021    (CN) .......................... 202110453690.6

(51) Int. Cl.
*G21K 1/00* (2006.01)
*G02B 5/30* (2006.01)
*G02B 27/28* (2006.01)

(52) U.S. Cl.
CPC ........... *G21K 1/006* (2013.01); *G02B 5/3083* (2013.01); *G02B 27/286* (2013.01)

(58) Field of Classification Search
CPC .... G21K 1/006; G02B 5/3083; G02B 27/286; G02B 27/28; G01N 15/1456; G01N 15/1434; G01N 2015/0038; G01N 2015/0046; G01B 7/02; G01B 21/042
See application file for complete search history.

(56) References Cited

U.S. PATENT DOCUMENTS

| 6,180,940 B1* | 1/2001 | Galstian ................. G21K 1/006 250/251 |
| 8,859,950 B2 | 10/2014 | Pascoguin et al. |
| 2002/0115163 A1* | 8/2002 | Wang ..................... G01N 30/00 435/173.9 |
| 2002/0132316 A1* | 9/2002 | Wang ...................... H05H 3/04 435/173.9 |

(Continued)

FOREIGN PATENT DOCUMENTS

| CN | 102841219 A | 12/2012 |
| WO | 9934653 A1 | 7/1999 |

*Primary Examiner* — David A Vanore
(74) *Attorney, Agent, or Firm* — W&G Law Group (57) ABSTRACT

Disclosed is a multi-dimensional optical tweezers calibration device based on electric field quantity calibration and a method thereof. The polarization-dependent characteristics of a tightly focused optical trap are utilized to realize triaxial electric field force calibration of particles through a one-dimensional electric field quantity calibration device. The method of the present application enables a particle electric field force calibration system to be compatible with particle delivery and particle detection systems; the device is simplified and calibration complexity is reduced.

5 Claims, 4 Drawing Sheets (56) References Cited

U.S. PATENT DOCUMENTS

| | | | |
|---|---|---|---|
| 2003/0012657 A1* | 1/2003 | Marr | F04B 19/006 |
| | | | 417/48 |
| 2005/0179904 A1 | 8/2005 | Larsen et al. | |
| 2010/0224493 A1* | 9/2010 | Davalos | B03C 5/005 |
| | | | 204/547 |
| 2012/0122084 A1* | 5/2012 | Wagner | G01N 15/14 |
| | | | 435/6.1 |
| 2015/0192510 A1* | 7/2015 | Piestun | G01N 15/1429 |
| | | | 702/152 |
| 2015/0346148 A1* | 12/2015 | Flory | B03C 5/028 |
| | | | 204/547 |
| 2019/0008388 A1* | 1/2019 | Ando | G01J 3/00 |
| 2020/0116623 A1* | 4/2020 | Cooper-Roy | G02B 21/32 |
| 2020/0237227 A1* | 7/2020 | Ando | G01J 3/00 |
| 2021/0293693 A1* | 9/2021 | Bharadwaj | G01N 15/147 |
| 2022/0344070 A1* | 10/2022 | Li | G02B 5/3083 |
| 2022/0350125 A1* | 11/2022 | Li | G01N 15/1433 |
| 2023/0135076 A1* | 5/2023 | Hu | G01R 29/12 |
| | | | 324/457 |

* cited by examiner

MULTI-DIMENSIONAL OPTICAL TWEEZERS CALIBRATION DEVICE AND METHOD BASED ON ELECTRIC FIELD QUANTITY CALIBRATION

CROSS-REFERENCE TO RELATED APPLICATIONS

The present application claims priority to Chinese Patent Application No. 202110453690.6, filed on Apr. 26, 2021, the content of which is incorporated herein by reference in its entirety.

TECHNICAL FIELD

The present application relates to the field of sensing calibration, in particular to a multi-dimensional optical tweezers calibration device based on electric field quantity calibration and a method thereof.

BACKGROUND

Optical tweezers technology, as a general tool for capturing and manipulating neutral particles, has been widely studied and applied in molecular biology, nanotechnology and experimental physics since it was well-known. Optical tweezers technology can be understood by a simple harmonic oscillator model through laser beam suspended particles. Compared with traditional oscillator models, the optical tweezers has no contact mechanical dissipation. Further, unlike the optical tweezers system in a liquid or an air medium, the optical tweezers system operating in vacuum can completely isolate the suspension unit from the environment. Based on the above advantages, the optical tweezers in vacuum is applied in basic physics such as thermodynamics, quantum physics and sensing fields. Scientists in the field of physics have done a lot of researches on optical tweezers in vacuum.

In the basic physics research of precision sensing based on vacuum optical trap technology, it is often necessary to establish the corresponding relationship between the photoelectric signal of particles and the actual movement information (displacement) of the particles, that is, to establish the conversion relationship between a photoelectric voltage signal and the displacement of the particles, and the establishment of this relationship often needs an accurate dynamic model. There are two commonly used calibration methods: (1) calibration according to the thermal equilibrium movement position of microspheres in the optical trap; (2) using the characteristics that microspheres are easy to be charged, the electric field force is calibrated by applying an electric field to the microspheres.

The thermal balance position calibration uses the equipartition theorem of the vacuum light trapping balls in thermal balance and the statistical properties of the motion state to realize the calibration of the optical tweezers. Since it is difficult to calibrate the thermal balance in high vacuum, the calibration of thermal balance is usually carried out at an air pressure of above 1 mbar, and errors may be introduced into the calibration results when applied at high vacuum.

Calibration can also be implemented without being affected by the vacuum degree in the electric field quantity calibration method, but the existing technology for calibrating the triaxial motion signals of particles is realized by installing electrode plates on six cross sections around the microspheres, so that the three-dimensional electric field device formed in this way makes it difficult for particle delivery and optical monitoring.

SUMMARY

In view of the shortcomings of the prior art, the present application provides a multi-dimensional optical tweezers calibration device based on electric field quantity calibration and a method thereof, and the specific technical solution is as follows:

A multi-dimensional optical tweezers calibration device based on electric field quantity calibration, comprising a laser, a beam splitter, a polarization modulator, a vacuum chamber, an objective lens, a parallel electric field imposing unit, an electric field quantity control unit, a first photodetector, a second photodetector, and a data processor;

the beam splitter, the polarization modulator, the objective lens, the parallel electric field imposing unit and the first photodetector are arranged on an exit light path of the laser in turn, and the objective lens and the parallel electric field imposing unit are all located in the vacuum chamber, and the parallel electric field imposing unit is externally connected with the electric field quantity control unit; the second photodetector is located on a reflection loop of the beam splitter, and both the first photodetector and the second photodetector are connected with the data processor.

Furthermore, the polarization modulator is a $\lambda/2$ glass slide.

A multi-dimensional optical tweezers calibration method based on electric field quantity calibration, wherein the method is implemented based on the above device;

the laser emits trapping laser, which passes through the beam splitter and the polarization modulator in turn and then enters the objective lens located in the vacuum chamber, and is converged by the objective lens to form an optical potential well; spherical nanoparticles are suspended in the optical potential well, the scattered light of the spherical nanoparticles in the optical potential well is recorded by the first photodetector, and the reference light split by the beam splitter is recorded by the second photodetector; the data processor calculate an electric signal change caused by a change of the scatter light caused by a three-dimensional movement of the spherical nanoparticles in the optical trap;

a reference coordinate system of optical tweezers is defined, wherein a light transmission direction in the optical potential well is a Z direction, a light polarization direction is a X direction, and a direction perpendicular to X and Z is a Y direction; a reference coordinate system of a calibration process is defined, wherein a light transmission direction in the optical potential well is a Z1 direction, an initial light polarization direction is a X1 direction, and a direction perpendicular to X1 and Z1 is a Y1 direction;

when an electric field direction of the parallel electric field imposing unit is adjusted to be along the X1 direction, a voltage-displacement conversion relationship is calibrated by measuring a differential electric signal in the X1 direction caused by the movement of the spherical nanoparticles in the electric field, and a calibration coefficient of the optical tweezers in the X direction is obtained by measurement;

when the electric field direction is kept along the X1 direction, the polarization modulator is adjusted to rotate the polarization direction of the incident light by 90°, that is, when the X1 and Y directions are parallel, the voltage-displacement conversion relationship is calibrated by measuring the differential electric signal in the X1 direction caused by the movement of the spherical nanoparticles in the electric field, and a calibration coefficient of the optical tweezers in the Y direction is obtained by measurement;

the initial light polarization direction is kept along the X1 direction or the polarization direction of the incident light is adjusted to be parallel to the Y1 direction, the parallel electric field imposing unit is rotated with the position of the spherical nanoparticles as a center to make the electric field have a projection component in the Z1 direction, the voltage-displacement conversion relationship is calibrated by measuring the differential electric signal generated by the movement of the spherical nanoparticles in the Z1 direction of the optical trap under the action of the electric field, and a calibration coefficient of the optical tweezers in the Z direction obtained by measurement.

Furthermore, a wavelength of the exit light of the laser is 1064 nm or 1550 nm.

Furthermore, the spherical nanoparticles are silica particles.

The present application has the following beneficial effects:

(1) according to the multi-dimensional optical tweezers calibration device based on electric field quantity calibration of the present application, the introduction of the electrode device does not affect the delivery of particles into the optical trap, and at the same time, the device supports the monitoring of the brightness and movement state of the particles through lateral scattered light in the calibration process;

(2) the existing calibration device can only calibrate the optical trap under a low air pressure, and the calibration range is expanded to high vacuum by the calibration method of electric field quantity, therefore the present method has a wider range of application;

(3) according to the method of the present application, all devices are simple and the calibration difficulty is low, providing reference for other multi-dimensional field measurement application research.

DESCRIPTION OF EMBODIMENTS

The purpose and effect of the present application will become clearer from the following detailed description of the present application according to the drawings and preferred embodiments. It should be understood that the specific embodiments described here are only used to explain, not to limit, the present application.

Figure 1:
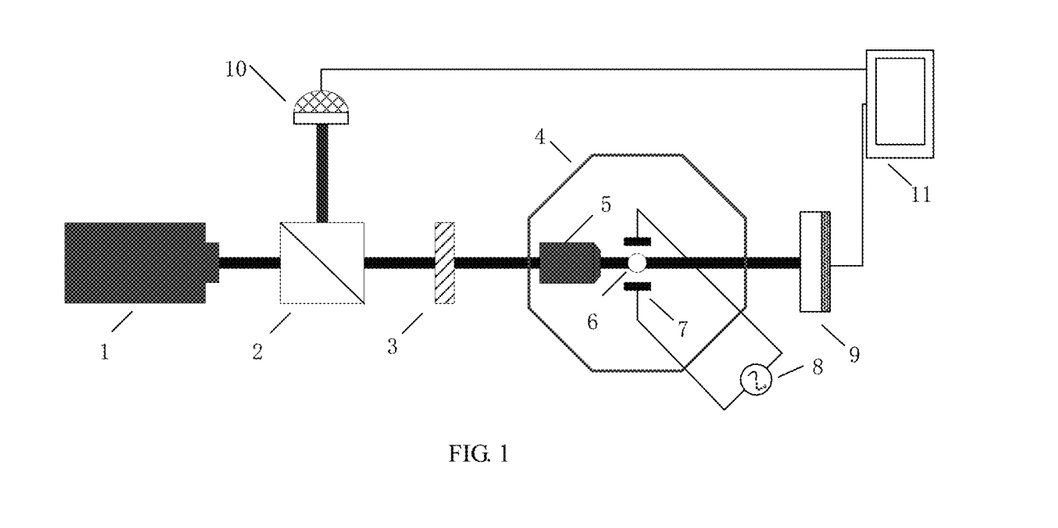
FIG. 1 is a schematic diagram of a device according to an embodiment of the present application.

As shown in FIG. 1, the multi-dimensional optical tweezers calibration device based on electric field quantity calibration of the present application includes a laser 1, a beam splitter 2, a polarization modulator 3, a vacuum chamber 4, an objective lens 5, a parallel electric field imposing unit 7, an electric field quantity control unit 8, a first photodetector 9, a second photodetector 10, and a data processor 11.

The beam splitter 2, the polarization modulator 3, the objective lens 5, the parallel electric field imposing unit 7 and the first photodetector 9 are arranged on the exit light path of the laser 1 in turn, and the objective lens 5 and the parallel electric field imposing unit 7 are all located in the vacuum chamber 4, and the parallel electric field imposing unit 7 is externally connected with an electric field quantity control unit 8; the second photodetector 10 is located on the reflection loop of the beam splitter 2, and both the first photodetector 9 and the second photodetector 10 are connected with the data processor 11.

The polarization modulator 3 is preferably a $\lambda/2$ glass slide, which can conveniently adjust the polarization of the incident light field.

The laser 1 emits trapping laser, which passes through the beam splitter 2 and the polarization modulator 3 in turn and then enters the objective lens 5 located in the vacuum chamber 4, and is converged by the objective lens 5 to form an optical potential well; spherical nanoparticles are suspended in the optical potential well, the scattered light of the spherical nanoparticles in the optical potential well is recorded by the first photodetector 9, and the reference light split by the beam splitter 2 is recorded by the second photodetector 10; the data processor 11 calculate an electric signal change caused by a change of the scatter light caused by a three-dimensional movement of the spherical nanoparticles in the optical trap;

According to the common knowledge in this field, a spherical nanoparticle with a mass m is subjected to three main external forces in an optical potential well: an optical force, a damping force and a random force.

Taking the movement of the spherical nanoparticle in one-dimensional x direction as an example, the movement equation of the spherical nanoparticle in one-dimensional optical trap can be expressed as follows:

$$\frac{d^2x}{dt^2} + \Gamma_0 \frac{dx}{dt} + \Omega_0^2 x = \frac{F_{rand}(t)}{m}$$

where $\Gamma_0$ represents a damping coefficient, which corresponds to the effect of the damping force; $\Omega_0$ is the intrinsic frequency of the optical trap, which corresponds to the photodynamic action; $F_{rand}(t)=(2k_BT\gamma)^{1/2}\zeta(t)$ represents the action of the random force, $k_B$ represents a Boltzmann constant, T represents the temperature, $\gamma=6\pi\eta R$ represents a Stokes friction coefficient of the spherical nanoparticle with a radius of R, and $\eta$ represents a fluid viscosity coefficient. The motion power spectrum of the corresponding spherical nanoparticle is $$S_x(\omega) = \frac{2k_BT}{m} \frac{\Gamma_0}{[(\omega^2 - \Omega_0^2)^2] + \omega^2\Gamma_0^2}$$

where $\omega$ represents a frequency value.

For the optical trap system, since the motion signals of the spherical nanoparticle are indirectly measured by converting an optical signal into an electrical signal, the power spectrum signal actually measured by the test system is voltage power spectrum $S_v(\omega)$, and the calibration method of the present application is to calibrate the relationship $S_v(\omega)$ $=c_x^2 S_x(\omega)$ between $S_v(\omega)$ and displacement power spectrum $S_x(\omega)$, that is, to calculate the calibration coefficient cx.

Assuming that the charge of the spherical nanoparticle is q, when the particle is driven by a sinusoidal electric field $E_0 \sin(\omega_{dr} t)$ with an amplitude of $E_0$ and a circular frequency of $\omega_{dr}$ in the x direction, its motion equation is expressed as follows:

$$\frac{d^2x}{dt^2} + \Gamma_0 \frac{dx}{dt} + \Omega_0^2 x = \frac{F_{rand}(t)}{m} + \frac{qE_0 \cos(\omega_{dr} t)}{m}$$

The motion spectrum of the spherical nanoparticle satisfies:

$$S_x(\omega) = \frac{2k_B T}{m} \frac{\Gamma_0}{[(\omega^2 - \Omega_0^2)^2] + \omega^2 \Gamma_0^2} + \frac{(qE_0)^2 \tau \mathrm{sinc}[(\omega - \omega_{dr})\tau]}{2m^2[(\omega^2 - \Omega_0^2)^2 + \Gamma_0^2 \omega^2]} = S_{x1}(\omega) + S_{x2}(\omega)$$

$S_{x1}(\omega)$ represents the power spectrum caused by the random force, and $S_{x2}(\omega)$ represents the power spectrum caused by a driving field, where $$\tau = \frac{\mathcal{T}}{2}; \mathcal{T}$$

is the present application time of the driving field.

The following can be obtained from the second part $S_{x2}(\omega)$ of the motion spectrum of spherical nanoparticle:

$$F_0 = qE_0 = \frac{\sqrt{2}\, m \sqrt{[(\omega^2 - \Omega_0^2)^2 + \Gamma_0^2 \omega^2]}}{\sqrt{\tau \mathrm{sinc}[(\omega - \omega_{dr})\tau]}} \sqrt{S_{x2}(\omega)}$$

For the fixed imposing time of a driving field and optical trap conditions, $F_0 \propto \sqrt{S_{x2}(\omega)}$, the root of the power spectrum caused by the second driving field corresponds to the displacement of the particle from the optical trap center. Therefore, the calibration coefficient cx of the force field and the displacement of the particle can be obtained by extracting $S_{x2}(\omega)$.

Figure 2:
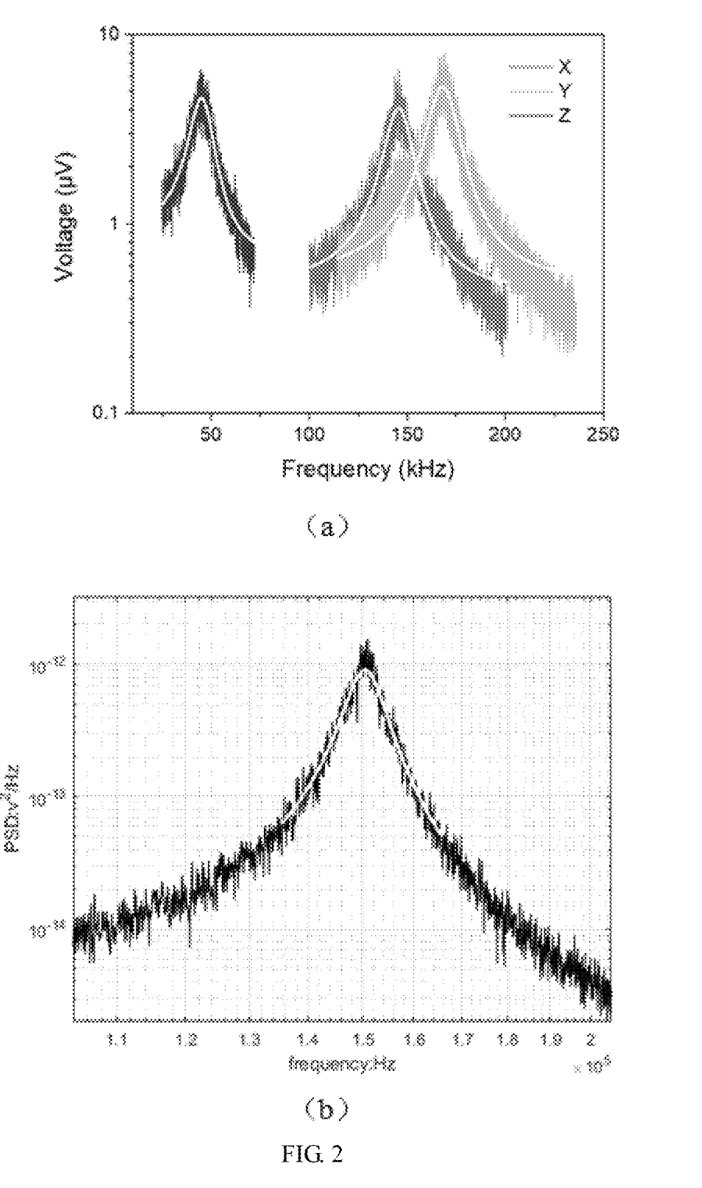
FIG. 2 shows the three-dimensional motion spectrum of the microspheres output by the optical tweezers system in the optical trap.

In the calculation formula of $F_0$, the eigenfrequency $\Omega_0$, the damping coefficient $\Gamma_0$ and the mass m of the spherical nanoparticle are unknown. The eigenfrequency $\Omega_0$ and the damping coefficient $\Gamma_0$ can be obtained by fitting the detected voltage power spectrum caused by the movement of the spherical nanoparticle. As shown in FIG. 2, (a) gives the power spectrum signals of the differential signals of the three axes X, Y and Z of the spherical nanoparticle measured by the calibration device in the example under the pressure of 10 mbar. According to $$S_x(\omega) = \frac{2k_B T}{m} \frac{\Gamma_0}{[(\omega^2 - \Omega_0^2)^2] + \omega^2 \Gamma_0^2},$$

the eigenfrequency $\Omega_0$ and damping coefficient $\Gamma_0$ can be obtained by fitting of the voltage power spectrum caused by the movement of the spherical nanoparticle.

As for the mass $m \leq 4/3 \rho R^3$ of the spherical nanoparticle, the density of the spherical nanoparticle with a specific materials is known, and the radius R of the spherical nanoparticle is obtained by the following formula:

$$\Gamma_0 = \frac{6\pi \eta R}{m} \times \frac{0.619}{0.619 + k_n} \times (1 + ck)$$

where $\eta$ represents the viscosity coefficient of a fluid, $$ck = 0.31 k_n/(0.785 + 1.152 k_n + k_n^2), k_n = \frac{l}{R}$$

is a Knudsen number, and $l = k_B T/(\sqrt{2} \pi d^2 \rho)$ is the free path of air molecules. All the above parameters can be obtained according to air pressure and temperature conditions.

Therefore, according to $\Omega_0$, $\Gamma_0$ and m, the real $S_{x2}(\omega)$ of the displacement motion spectrum of the spherical nanoparticle can be directly calculated. By combining with the voltage power spectrum $S_v(\omega)$ obtained by direct detection, the calibration coefficient cx can be obtained according to $S_v(\omega) = c_x^2 S_x(\omega)$.

For three-dimensional optical tweezers, the calibration process for three vector directions X, Y and Z is similar. FIG. 2 (b) shows the differential signal of optical tweezers in Y direction measured at 10 mbar. After fitting and calibration, the calibration coefficient $c_y = 2.71 \times 10^4$ V/m is obtained. The solid white line in the figure is the Gaussian fitting curve of the power spectrum of the particle in the Y direction.

Figure 3:
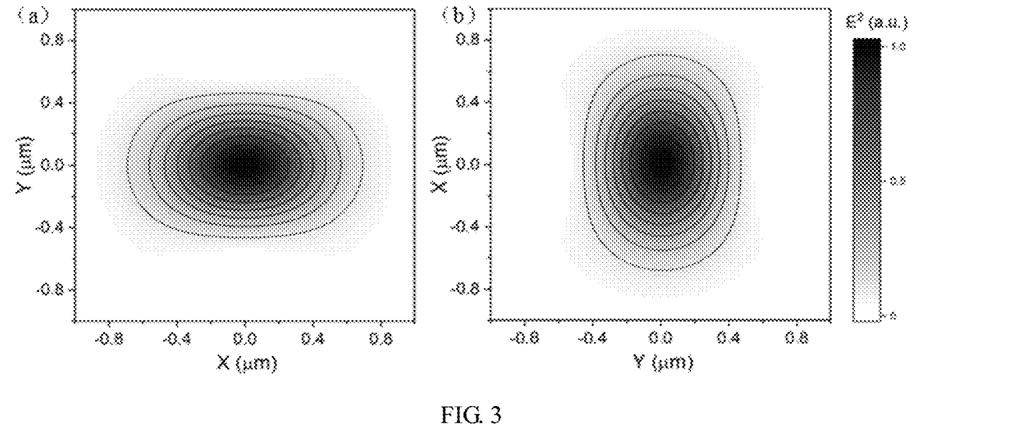
FIG. 3 shows the light intensity distribution on a focal plane of an optical potential well.
Figure 4:
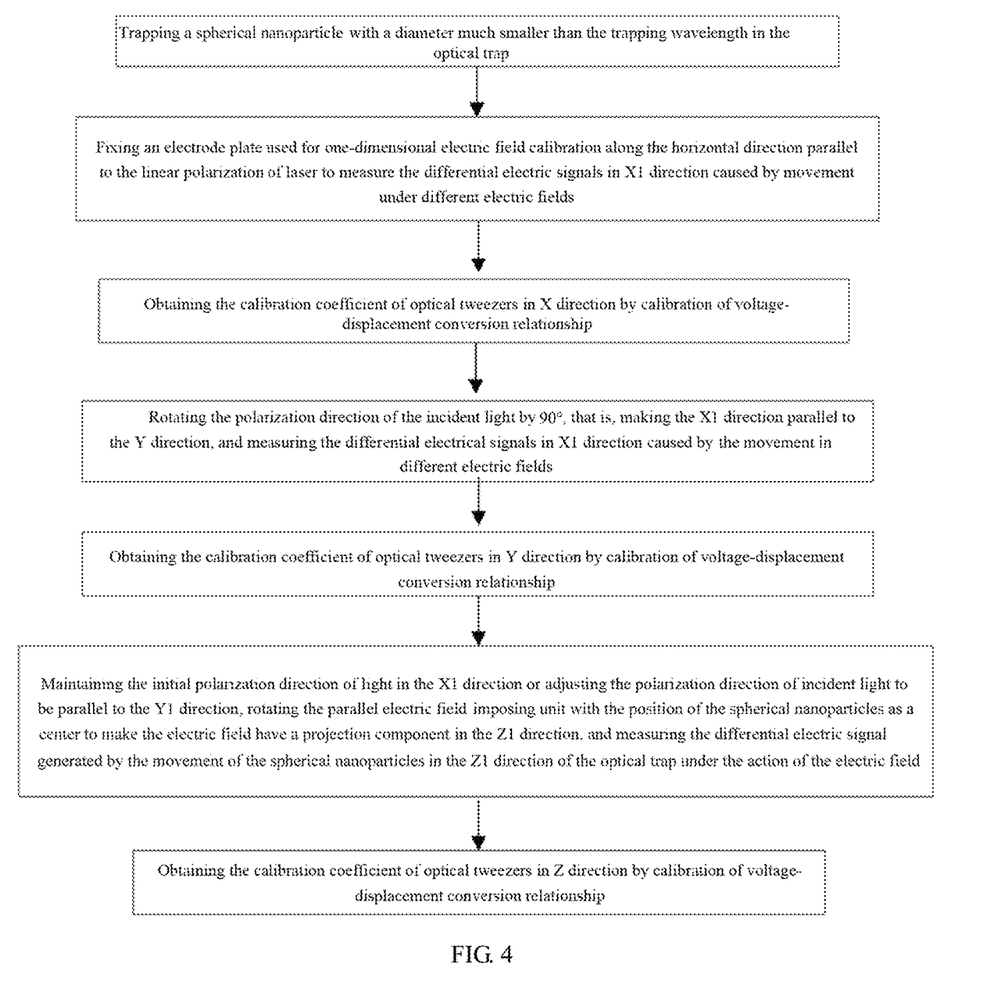
FIG. 4 is a flow chart of the calibration method of the present application.

In order to conveniently understand the dependence of the cross section of the optical trap formed by tight focusing of the objective lens on the linear polarization direction of the incident laser, the light intensity distribution of the cross section of the optical trap at the focal plane of the objective lens is known by numerical calculation. The linearly polarized output laser beam with a wavelength of 1064 nm is expanded to a beam waist of about 4.5 mm@$1/e^2$, and is then collimated and coupled to an objective lens with NA=0.9 and a barrel length of 200 mm. After focusing by the objective lens, a tightly focused optical tweezers optical trap is formed. The distribution of the light intensity in the focal plane calculated mathematically is shown in (a) of FIG. 3. It can be seen that the contour line of the light intensity distribution on the focal plane is elliptical with obvious major and minor axes, the major axis direction is consistent with the laser polarization direction, and the minor axis direction is perpendicular to the laser polarization direction. After the input polarization direction is adjusted by 90 degrees, the light intensity distribution on the focal plane is spatially rotated by 90 degrees, as shown in (b) of FIG. 3.

Therefore, the multi-dimensional optical tweezers calibration method based on electric field quantity calibration of the present application, as shown in FIG. 1, specifically includes:

the laser 1 emits trapping laser, which passes through the beam splitter 2 and the polarization modulator 3 in turn and then enters the objective lens 5 located in the vacuum chamber 4, and is converged by the objective lens 5 to form an optical potential well; spherical nanoparticles are suspended in the optical potential well, the scattered light of the spherical nanoparticles in the optical potential well is recorded by the first photodetector 9, and the reference light split by the beam splitter 2 is recorded by the second photodetector 10; the data processor 11 calculate an electric signal change caused by a change of the scatter light caused by a three-dimensional movement of the spherical nanoparticles in the optical trap;

a reference coordinate system of optical tweezers is defined, wherein a light transmission direction in the optical potential well is a Z direction, a light polarization direction is a X direction, and a direction perpendicular to X and Z is a Y direction; a reference coordinate system of a calibration process is defined, wherein a light transmission direction in the optical potential well is a Z1 direction, an initial light polarization direction is a X1 direction, and a direction perpendicular to X1 and Z1 is a Y1 direction;

when an electric field direction of the parallel electric field imposing unit 7 is adjusted to be along the X1 direction, a voltage-displacement conversion relationship is calibrated by measuring a differential electric signal in the X1 direction caused by the movement of the spherical nanoparticles in the electric field, and a calibration coefficient of the optical tweezers in the X direction is obtained by measurement;

when the electric field direction is kept along the X1 direction, the polarization modulator 3 is adjusted to rotate the polarization direction of the incident light by 90°, that is, when the X1 and Y directions are parallel, the voltage-displacement conversion relationship is calibrated by measuring the differential electric signal in the X1 direction caused by the movement of the spherical nanoparticles in the electric field, and a calibration coefficient of the optical tweezers in the Y direction is obtained by measurement;

the initial light polarization direction is kept along the X1 direction or the polarization direction of the incident light is adjusted to be parallel to the Y1 direction, the parallel electric field imposing unit 7 is rotated with the position of the spherical nanoparticles as a center to make the electric field have a projection component in the Z1 direction, the voltage-displacement conversion relationship is calibrated by measuring the differential electric signal generated by the movement of the spherical nanoparticles in the Z1 direction of the optical trap under the action of the electric field, and a calibration coefficient of the optical tweezers in the Z direction obtained by measurement.

In order to reduce the endothermic damage of the spherical nanoparticles in the optical trap, silica particles with weak light absorption are generally chosen as the spherical nanoparticles; considering the lower wavelength band in the absorption spectrum of silica and the more mature wavelength in the laser development level, it is preferred that the output wavelength of laser 1 is 1064 nm or 1550 nm to trap spherical nanoparticles.

It can be understood by those skilled in the art that the above description is only the preferred examples of the present application, and is not used to limit the present application. Although the present application has been described in detail with reference to the foregoing examples, those skilled in the art can still modify the technical solutions described in the foregoing examples or replace some of their technical features equivalently. The modifications, equivalent substitutions and the like made within the spirit and principle of the present application should be included within the scope of protection of the present application.

What is claimed is:

1. A multi-dimensional optical tweezers calibration device based on electric field quantity calibration, comprising a laser (1), a beam splitter (2), a polarization modulator (3), a vacuum chamber (4), an objective lens (5), a parallel electric field imposing unit (7), an electric field quantity control unit (8), a first photodetector (9), a second photodetector (10), and a data processor (11);

wherein the beam splitter (2), the polarization modulator (3), the objective lens (5), the parallel electric field imposing unit (7) and the first photodetector (9) are arranged on an exit light path of the laser (1) in turn, and the objective lens (5) and the parallel electric field imposing unit (7) are all located in the vacuum chamber (4), and the parallel electric field imposing unit (7) is externally connected with the electric field quantity control unit (8); the second photodetector (10) is located on a reflection loop of the beam splitter (2), and both the first photodetector (9) and the second photodetector (10) are connected with the data processor (11).

2. The multi-dimensional optical tweezers calibration device based on electric field quantity calibration according to claim 1, wherein the polarization modulator (3) is a λ/2 glass slide.

3. A multi-dimensional optical tweezers calibration method based on electric field quantity calibration, wherein the method is implemented with the device of claim 1; and the method comprises:

emitting trapping laser by the laser (1), wherein the trapping laser passes through the beam splitter (2) and the polarization modulator (3) in turn and then enters the objective lens (5) located in the vacuum chamber (4), and is converged by the objective lens (5) to form an optical potential well;

recording the scattered light of the spherical nanoparticles in the optical potential well is recorded by the first photodetector (9), wherein spherical nanoparticles are suspended in the optical potential well;

recording the reference light split by the beam splitter (2) by the second photodetector (10);

and calculating an electric signal change caused by a change of the scatter light caused by a three-dimensional movement of the spherical nanoparticles in the optical trap by the data processor (11);

wherein a reference coordinate system of optical tweezers is defined, wherein a light transmission direction in the optical potential well is a Z direction, a light polarization direction is an X direction, and a direction perpendicular to X and Z is a Y direction; a reference coordinate system of a calibration process is defined, wherein a light transmission direction in the optical potential well is a Z1 direction, an initial light polarization direction is a X1 direction, and a direction perpendicular to X1 and Z1 is a Y1 direction;

wherein when an electric field direction of the parallel electric field imposing unit (7) is adjusted to be along the X1 direction, a voltage-displacement conversion relationship is calibrated by measuring a differential electric signal in the X1 direction caused by the movement of the spherical nanoparticles in the electric field, and a calibration coefficient of the optical tweezers in the X direction is obtained by measurement;

when the electric field direction is kept along the X1 direction, the polarization modulator (3) is adjusted to rotate the polarization direction of the incident light by 90 degrees, that is, when the X1 and Y directions are parallel, the voltage-displacement conversion relationship is calibrated by measuring the differential electric signal in the X1 direction caused by the movement of the spherical nanoparticles in the electric field, and a calibration coefficient of the optical tweezers in the Y direction is obtained by measurement; and when the initial light polarization direction is kept along the X1 direction or the polarization direction of the incident light is adjusted to be parallel to the Y1 direction, the parallel electric field imposing unit (7) is rotated with the position of the spherical nanoparticles as a center to make the electric field have a projection component in the Z1 direction, the voltage-displacement conversion relationship is calibrated by measuring the differential electric signal generated by the movement of the spherical nanoparticles in the Z1 direction of the optical trap under the action of the electric field, and a calibration coefficient of the optical tweezers in the Z direction obtained by measurement.

4. The multi-dimensional optical tweezers calibration method based on electric field quantity calibration according to claim 3, wherein a wavelength of the exit light of the laser (1) is 1064 nm or 1550 nm.

5. The multi-dimensional optical tweezers calibration method based on electric field quantity calibration according to claim 3, wherein the spherical nanoparticles are silica particles.

\* \* \* \* \*